Nov. 29, 1960 T. S. KULKA 2,962,160

TAPE RETAINING MEANS FOR TAPE WOUND ON A REEL

Filed May 12, 1959

3 Sheets-Sheet 1

INVENTOR

THOMAS S. KULKA

BY [signature]

ATTORNEY

Nov. 29, 1960 T. S. KULKA 2,962,160
TAPE RETAINING MEANS FOR TAPE WOUND ON A REEL
Filed May 12, 1959
3 Sheets-Sheet 2

INVENTOR
THOMAS S. KULKA
BY Elmer S. Nelson
ATTORNEY

TAPE RETAINING MEANS FOR TAPE WOUND ON A REEL

Filed May 12, 1959

3 Sheets-Sheet 3

INVENTOR
THOMAS S. KULKA

BY Wilmon S. Nelson

ATTORNEY

United States Patent Office 2,962,160
Patented Nov. 29, 1960

2,962,160

TAPE RETAINING MEANS FOR TAPE WOUND ON A REEL

Thomas S. Kulka, 200 Film Bldg., 2108 Payne Ave., Cleveland 14, Ohio

Filed May 12, 1959, Ser. No. 812,737
5 Claims. (Cl. 206—53)

This invention relates to the storage and handling of materials and more particularly to devices for retaining tape in place on a reel and prevent inadvertent unwinding thereof.

The use of tape coated with a suitable magnetic material is now widely used for the recording of sound or video program material and since this tape is relatively thin and fragile, care must be taken in the use and storage of the same in order to prevent damage thereto. Different widths of tape may be utilized for different purposes and such tape is commonly stored on reels, either before or after recording, and in length from six hundred to several thousand feet. Accordingly, it is important to adequately protect such tape and prevent inadvertent unwinding thereof from the reel on which the same is wound, since as a result of such unwinding, the tape may become easily damaged and heretofore several different methods have been utilized for retaining the tape on the reel and preventing unwinding thereof.

Previously utilized methods for preventing unwinding of tape stored on a reel have included merely enclosing the reel in a suitable box or other container and while this in some cases, adequately serves the purpose as long as the reel remains in the box, upon removal therefrom the tape frequently becomes unwound and may become tangled and damaged. An elastic or rubber band has heretofore been applied around the tape on the reel to prevent unwinding of the same and while this may adequately serve the purpose in some cases, nevertheless, difficulty has been experienced due to the tendency of the elastic band to slip between the tape and the flanges of the reel thereby destroying any holding function and furthermore, it has proved somewhat difficult to hold the reel with the tape wound thereon and apply the elastic band thereto without damage to the tape. Metal clips have also been proposed and utilized but these are somewhat difficult to use and may easily result in damage to the tape. Also the use of boxes or containers, as well as devices in the nature of metallic clips have proved relatively costly and in addition, failed to fulfill the purpose for which they are intended.

It is accordingly an object of the invention to provide a retaining means for tape wound on a reel, which means may be conveniently and economically constructed from readily available and inexpensive materials and which may be conveniently applied to the tape wound on a reel to prevent inadvertent unwinding thereof.

A further object of the invention is the provision of a retaining means for tape wound on a reel, such means including an elastic member for engaging the tape and including means for preventing displacement of the member into the space between the tape and the flanges of the reel.

A still further object of the invention is provision of a retaining means for tape wound on a reel, such means being largely constructed from elastic material, such as rubber and including means for locating the same on a reel and for preventing inadvertent removal thereof thereby retaining the tape in position on a reel.

Another object of the invention is the provision of a retaining means for tape wound on a reel in which the means engaging the tape is formed of soft yieldable material thereby precluding damage to the tape.

A further object of the invention is the provision of tape retaining means for tape wound on a reel, such means including an elastic band for engaging the tape and a metallic clip on the band for engaging the peripheral edge of one flange to retain the band in position in engagement with the tape to prevent unwinding and retain the same on the reel.

A still further object of the invention is the provision of tape retaining means for tape wound on a reel, such means including a tubular elastic band for engaging the tape and a metallic clip or hook on the band for engaging the peripheral edge of one flange of the reel, to retain the band in position in engagement with the tape, to prevent unwinding and retain the same on the reel.

Another object of the invention is the provision of tape retaining means for tape wound on a reel, such means comprising an elastic band of channel cross section for use with the band engaging the tape and with the peripheral edge of one flange received in the channel to retain the band in position and prevent unwinding of the tape and retain the same on the reel.

A further object of the invention is the provision of tape retaining means for tape wound on a reel, such means comprising a tubular elastic tape engaging member and an elastic band extending through the tubular member, the tubular member serving to engage the tape on a reel and the elastic band being disposed across the outer side surface of one flange of the reel to retain the tubular member in engagement with the tape to prevent unwinding and retain the same on the reel.

A still further object of the invention is the provision of tape retaining means for tape wound on a reel, such means comprising an elastic band and a plurality of pairs of yieldable blocks secured to opposite sides of the band for engaging the tape with a portion of the band disposed across the outer side surface of one flange of the reel to retain the band in position and prevent unwinding of the tape.

Another object of the invention is the provision of tape retaining means for tape wound on a reel, such means comprising an elastic band and a plurality of yieldable tubular tape engaging members slidably received on the band and frictionally held in spaced relationship, a portion of the band and certain of the members engaging the tape and another portion of the band being disposed across the outer side surface of one flange to retain the band in position and prevent unwinding of the tape.

Further objects and advantages of the invention will be apparent from the following description taken in conjunction with the accompanying drawings wherein:

Fig. 1 is a front elevational view of a reel with tape wound thereon and with a retaining means constructed in accordance with one form of this invention applied thereto;

Fig. 2 a side elevational view of the reel and retaining means shown in Fig. 1;

Figures 3, 5:
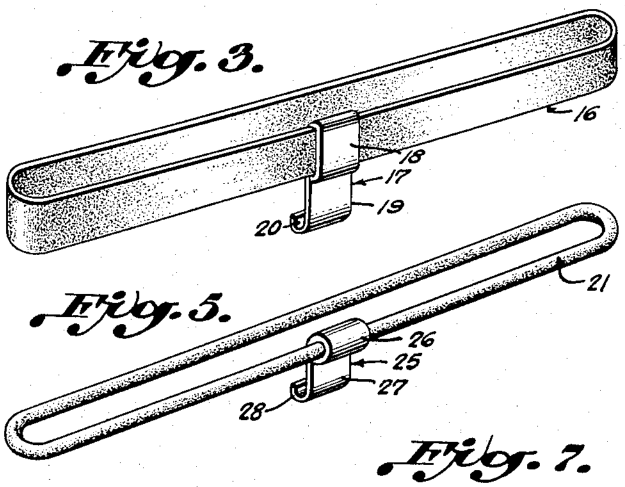
Fig. 3 is a view in perspective showing the retaining means of Fig. 1 prior to applying the same to tape wound on a reel.
Fig. 5 is a view in perspective showing another form of retaining means prior to applying the same to tape wound on a reel.
Figure 6:
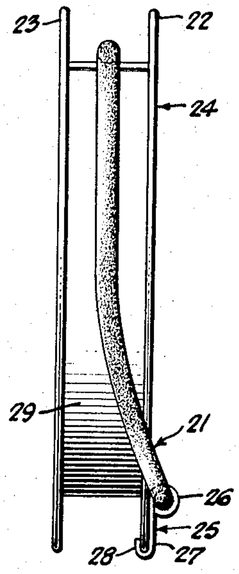
Figure 7:
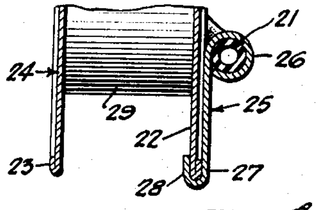
Figure 4:
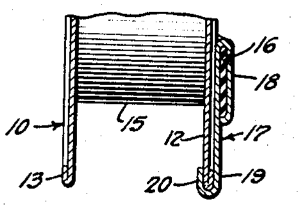
Fig. 4 is a fragmentary sectional view taken substantially on the line 4—4 of Fig. 1 and showing a detail of construction of this form of the retaining means of the invention.
Figure 8:
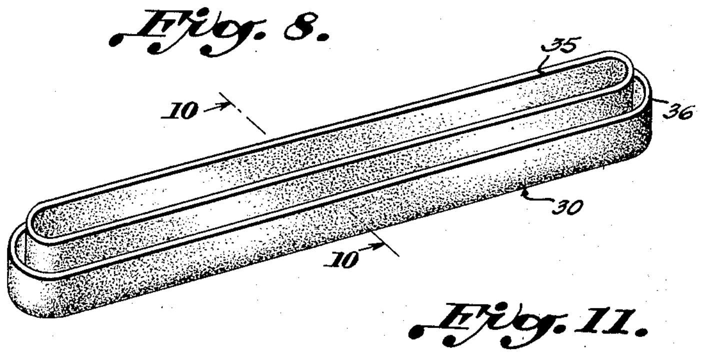
Figure 9:
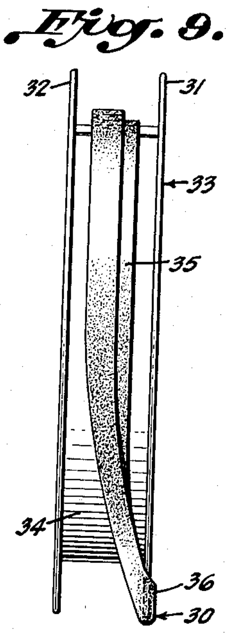
Figure 10:
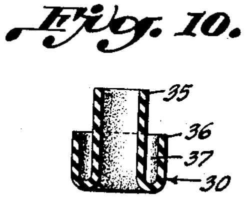
Figure 11:
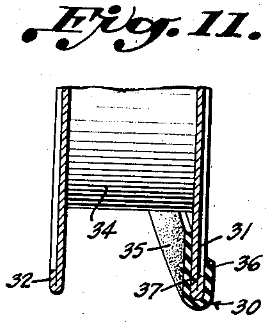
Figures 12, 13:
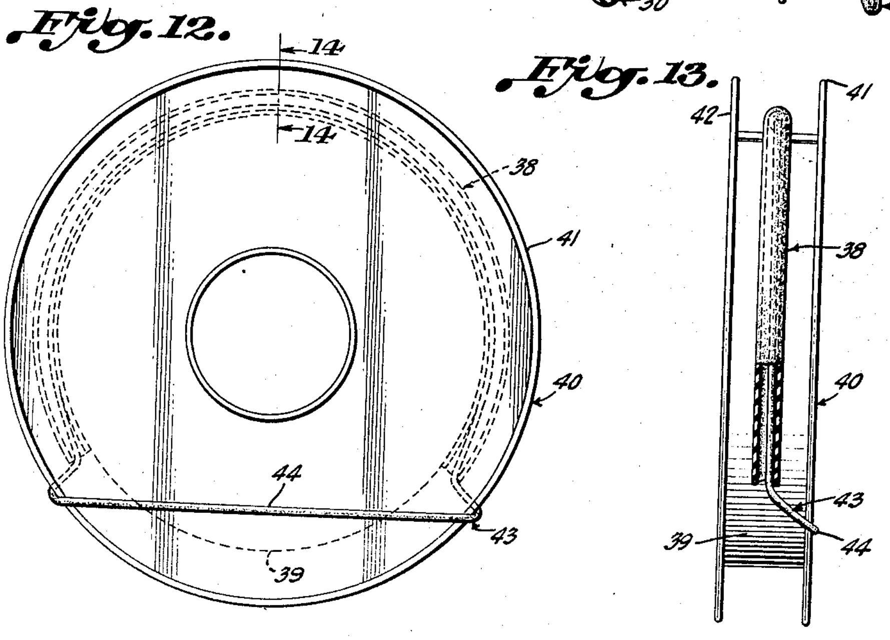
Figure 14:
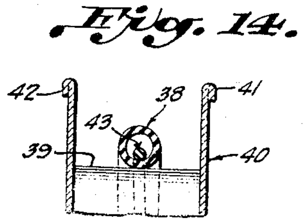
Figure 15:
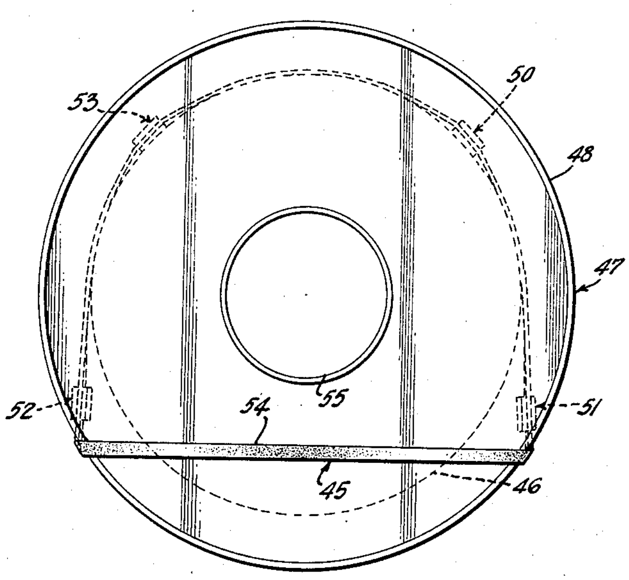
Figure 16:
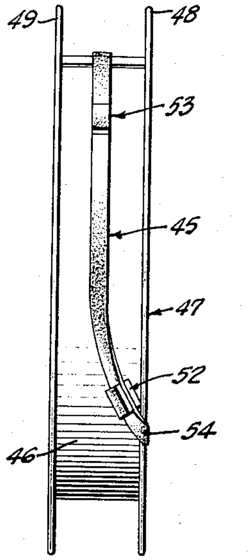
Figures 17, 18, 19, 20:
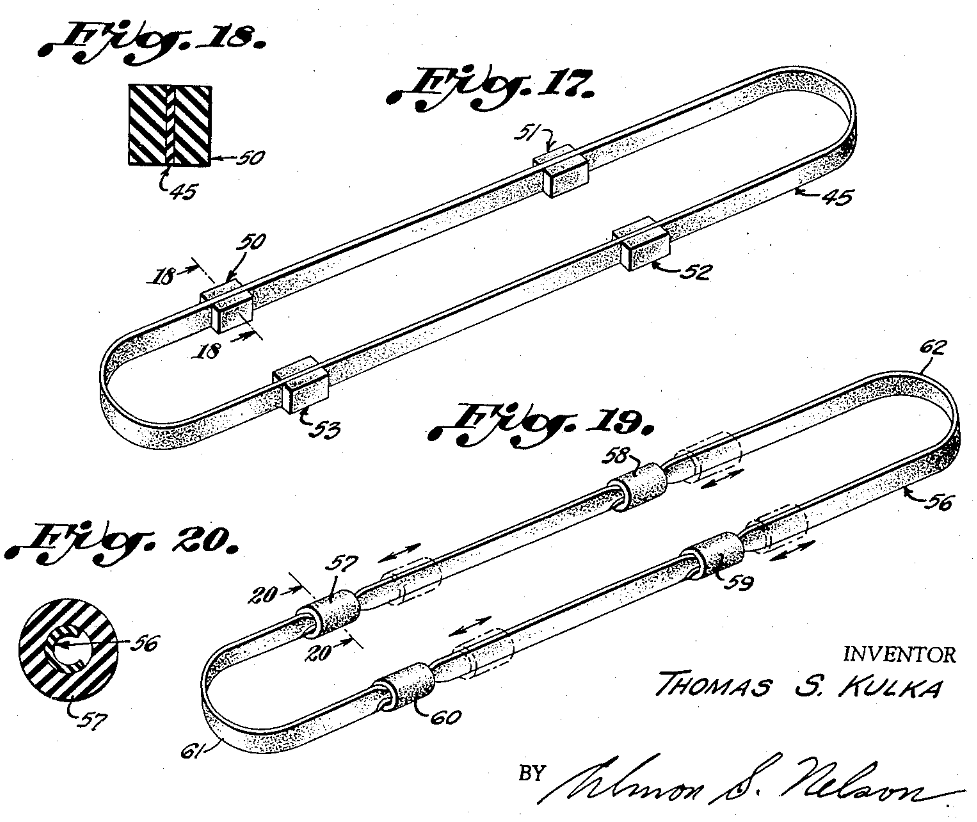

Fig. 6 a side elevational view of a reel with tape wound thereon and with a retaining means constructed in accordance with the form of the invention shown in Fig. 5 applied thereto;

Fig. 7 a fragmentary sectional view similar to Fig. 4, but showing a detail of construction of the form of retaining means shown in Fig. 5;

Fig. 8 a view in perspective showing a further modified form of the tape retaining means prior to applying the same to tape wound on a reel;

Fig. 9 a side elevational view showing a reel with tape wound thereon and with the retaining means of Fig. 8 applied thereto;

Fig. 10 is a sectional view taken substantially on the line 10—10 of Fig. 8;

Fig. 11 a fragmentary sectional view showing the manner in which the retaining means of Fig. 8 engages a flange of the reel to hold the retaining means thereon;

Fig. 12 a front elevational view of a reel with tape wound thereon and with a still further modified form of retaining means applied thereto;

Fig. 13 a side elevational view of the reel and retaining means shown in Fig. 12;

Fig. 14 a fragmentary sectional view taken substantially on the line 14—14 of Fig. 12;

Fig. 15 a front elevational view of a reel with tape wound thereon and with another form of retaining means applied thereto;

Fig. 16 a side elevational view of the reel and retaining means shown in Fig. 15;

Fig. 17 a view in perspective showing the retaining means of Fig. 15 prior to applying the same to tape wound on a reel;

Fig. 18 a sectional view taken substantially on the line 18—18 of Fig. 17;

Fig. 19 a view in perspective showing a still further modified form of the retaining means prior to applying the same to tape wound on a reel; and Fig. 20 a sectional view taken substantially on the line 20—20 of Fig. 19.

With continued reference to the drawings and particularly Figs. 1 to 4, there is shown one form of retaining means constructed in accordance with this invention and which may be utilized on a reel 10 formed of plastic or other suitable material, the reel 10 being provided with a hub 11 and spaced side flanges 12 and 13. The reel 10 is intended to receive tape 15 wound thereon and such tape may be entirely conventional and is commonly formed of plastic or other suitable material coated with magnetic material at one side thereof and such tape may be supplied in different widths and lengths and is widely utilized for recording sound or video program material on suitable recording apparatus and may also be utilized for playback of the material on the same or other apparatus. It is also to be noted, that the tape 15 is wound on the reel 10 in such a manner as to provide an outer diameter less than the diameter of the flanges 12 and 13.

The retaining means shown in Figs. 1 to 4 may well comprise a flat elastic band 16 formed of rubber or other suitable elastic material and the band 16 is of less diameter than the diameter of the flanges 12 and 13 and is also of a width not greater than the space between the flanges 12 and 13. A metallic member 17 is provided with a portion 18 embracing the band 16 and the metallic member 17 is also provided with a laterally projecting portion 19 terminating in a hook 20.

Figure 1:
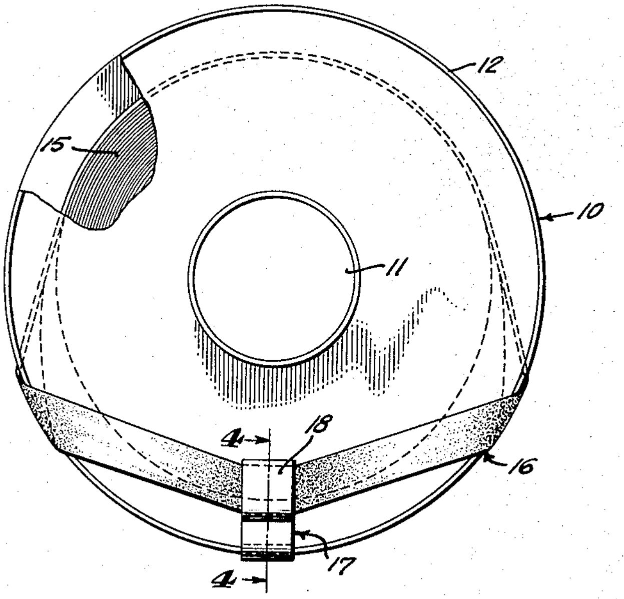
Figure 2:
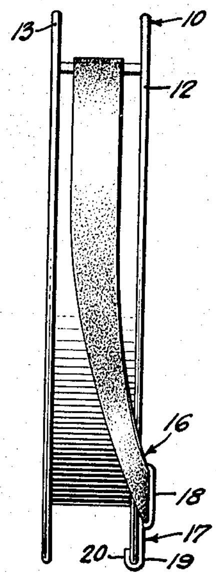

The use of the retaining means above described, is particularly shown in Figs. 1 and 2 and as will be seen from an inspection of these figures, the band 16 is disposed between the flanges 12 and 13 in engagement with the tape 15 and the remaining portion of the band 16 is disposed across the outer side surface of the flange 12 to one side of the center of the hub 11 and the hook 20 engages the peripheral edge of the flange 12 to retain the band 16 in position in engagement with the tape 15 to retain the same on the reel 10. The width of the band 16 precludes displacement of the same between the tape 15 and either of the flanges 12 and 13 and as will be seen, application of the band 16 to the reel 10 is comparatively simple and may be accomplished without danger of damage to the tape 15. While the member 17 has been described as metallic, obviously the same may be formed of plastic or other suitable material and likewise the dimensions of the band 16 may be varied to accommodate reels of different sizes or tape of different widths.

The modified form of retaining means shown in Figs. 5 to 7 is somewhat similar to that described above and this form of the invention comprises a tubular elastic band 21 of less diameter than the diameter of the flanges 22 and 23 of the reel 24 to which the band 21 is to be applied and also the band 21 is of a cross sectional diameter not greater than the space between the flanges 22 and 23 of the reel 24. A metallic member 25 is provided with a portion 26 embracing the band 21 and the member 25 is also provided with a laterally projecting portion 27 terminating in a hook 28.

In use, it is assumed that tape 29 is wound on the reel 24 between the flanges 22 and 23 and the retaining means shown in Fig. 5 is applied thereto with a portion of the tubular elastic band 21 disposed between the flanges 22 and 23 in engagement with the tape 29 and another portion of the elastic band 21 is disposed across the outer side surface of the flange 22 to one side of the center of the hub of the reel 24 and the hook 29 engages the peripheral edge of the flange 22 as clearly shown in Fig. 6, to retain the band in place on the reel in engagement with the tape 29 to prevent unwinding of the same. The cross sectional diameter of the tubular elastic band 21 prevents displacement of the same between the tape 29 and either flange 22 or 23 and while the member 25 is described as metallic, it is to be understood that such member may be formed of plastic or other suitable material. Obviously this form of the invention may be conveniently applied to the reel 24 and will operate to retain the tape 29 thereon to prevent inadvertent unwinding and damage to the tape.

With particular reference to Figs. 8 to 11 there is shown a still further modified form of the invention in which the retaining means comprises an elastic band 30 of less diameter than the diameter of the flanges 31 and 32 of a reel 33 having tape 34 wound thereon and as clearly shown in Figs. 8 and 10, the elastic band 30 is of channel cross section with the inner side 35 of the channel being of greater width than the outer side 36. It is also to be noted that the width of the inner side 35 of the channel forming the elastic band 30 is of a width not greater than the space between the flanges 31 and 32 of the reel 33.

In the operation of the form of the invention shown in Figs. 8 to 11, the elastic band 30 is disposed between the flanges 31 and 32 of the reel 33 with the inner side 35 of the band 30 engaging the tape 34 and as clearly shown in Figs. 9 and 11, the peripheral edge of the flange 31 is received in the channel 37 formed by the inner and outer sides 35 and 36 of the band 30 and disengagement of the peripheral edge of the flange 31 in the channel 37 serves to retain the band 30 on the reel 33 in engagement with the tape 34 to prevent unwinding of the same.

The retainer shown in Figs. 8 to 11 may be conveniently and economically manufactured from rubber or other suitable elastic material and the same may be conveniently applied to the reel 33 without danger of damaging the tape 34 and will operate to securely retain the tape 34 in place on the reel 33.

In the form of the invention shown in Figs. 12 to 14, the retaining means comprises a tubular elastic tape engaging member 38 of less length than the circumference of the tape 39 wound on a reel 40 between the flanges 41 and 42 thereof and extending through the tubular tape engaging member 38 is an elastic band 43 of less diameter than the diameter of said flanges. It is also to be noted that the cross sectional diameter of the tubular tape engaging member 38 is less than the space between the flanges 41 and 42 of the reel 40.

In the operation of the form of the invention shown in Figs. 12 to 14, the elastic tubular tape engaging member 38 is disposed between the flanges 41 and 42 of the reel 40 in engagement with the tape 39 and the portion 44 of the elastic band 43 between the ends of the tubular member 38 is disposed across the outer side surface of the flange 41 as clearly shown in Figs. 12 and 13 to one side of the center of the hub of the reel 40 in order to retain the tubular member 38 in engagement with the tape 39 and prevent unwinding thereof.

The tubular member 38 as well as the band 43 may be conveniently and economically manufactured from rubber or other suitable elastic material and obviously the same may be conveniently applied to the reel 40 without danger of damaging the tape 39.

With particular reference to Figs. 15 to 18, there is shown a still further modified form of the invention in which the retaining means comprises an elastic band 45 of less length than the circumference of the tape 46 wound on a reel 47 between side flanges 48 and 49 and secured to opposite sides of the elastic band 45 are spaced pairs of yieldable blocks 50, 51, 52 and 53. The band 45 may be formed of rubber or other suitable elastic material and the blocks 50, 51, 52 and 53 may also be formed of rubber or other suitable yieldable material and may be cemented or otherwise secured to the inner and outer side surfaces of the elastic band 45 as clearly shown in Figs. 17 and 18.

In utilizing the form of the invention shown in Figs. 15 to 18, the retainer is applied to the reel 47 with blocks 50 and 53 in engagement with the surface of the tape 46 and also with a portion of the band 45 in engagement with such tape. And other portion 54 of the band 45 is disposed across the outer side surface of the flange 48 of the reel 47 to one side of the hub 55 of the reel 47 and as will be seen from an inspection of Figs. 15 and 16, the blocks 51 and 52 engage the inner side surface of the flange 48 and prevent inadvertent movement of the portion 54 of the band 45 thereby retaining the band 45 in position and preventing inadvertent unwinding of the tape 46. This form of the invention operates to securely retain the tape 46 on the reel 47 and this retainer may be conveniently applied to the reel 47 without danger of damaging the tape 46.

In Figs. 19 and 20 there is shown a still further modified form of the invention in which the retaining means comprises an elastic band 56 of less length than the circumference of the tap wound on a reel to which the retaining means is to be applied and the tape 56 may be formed of rubber or other suitable elastic material. Mounted on the elastic band 56 are a plurality of tubular yieldable tape engaging members 57, 58, 59 and 60 and these members which may be formed of rubber or other suitable yieldable material are frictionally retained in position on the band 56, but may be moved thereon to any desired position in order to properly engage the tape and also the inner surface of a flange of the reel in the same manner as the blocks describing in connection with the form of the invention shown in Figs. 15 to 18. The tubular members 57, 58, 59 and 60 may be positioned as shown in full lines in Fig. 19 or may be moved to other desired positions as shown in dotted lines in this figure. There is sufficient friction between the band 56 and the tubular members in order to retain the same in desired position.

The form of the invention shown in Figs. 19 and 20 is utilized in the same manner as the retaining means shown in Figs. 15 to 18 and no further description of the use and operation of this form of the invention is considered necessary or desirable, it being merely necessary to state that the tubular members 57 and 60, as well as the portion 61 of the band therebetween may engage the tape while the portion 62 of the band 56 is disposed across the outer side surface of one flange of the reel to one side of the center of the hub and the tubular members 58 and 59 engage the inner side surface of the flange of the reel in order to retain the portion 62 of the band 56 in position and also retain the band and tape engaging members in position on the reel.

While the tape retaining means of this invention have been described primarily for use in connection with magnetic tapes, it is to be understood that this is for illustrative purposes only, and that such retaining means may be utilized for other forms of tapes, such as motion picture film or the like, and indeed may be utilized for retaining tape on a reel wherever desired. It will be obvious that the above described forms of the invention provide tape retaining means which may be economically constructed from inexpensive materials and which will operate to adequately retain tape on a reel in a manner and for the purpose intended.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A tape retaining means for tape wound on a reel, said reel having a hub and spaced side flanges and with the tape wound on said hub between said flanges having a diameter less than the diameter of said flanges, said retaining means comprising an elastic band of less diameter than the diameter of said flanges and a plurality of pairs of yieldable blocks secured to opposite sides of said band in spaced relationship, whereby said band may be received between said flanges with a portion of said band and certain of said blocks engaging said tape and with another portion of said band disposed across the outer side surface of one flange to one side of the center of said hub to retain said band in position and prevent unwinding of said tape.

2. A tape retaining means for tape wound on a reel, said reel having a hub and spaced side flanges and with the tape wound on said hub between said flanges having a diameter less than the diameter of said flanges, said retaining means comprising an elastic band of less diameter than the diameter of said flanges and a plurality of yieldable blocks secured to each opposite side of said band in spaced relationship, whereby said band may be received between said flanges with a portion of said band and certain of said blocks engaging said tape and with another portion of said band disposed across the outer side surface of one flange to one side of the center of said hub to retain said band in position and prevent unwinding of said tape.

3. A tape retaining means for tape wound on a reel, said reel having a hub and spaced side flanges and with the tape wound on said hub between said flanges having a diameter less than the diameter of said flanges, said retaining means comprising an elastic band of less length than the circumference of said tape and a plurality of yieldable tubular tape engaging members slidably received on said band and frictionally held in spaced relationship thereon, whereby said band may be received between said flanges with a portion of said band and certain of said members engaging said tape and with another portion of said band disposed across the outer side surface of one flange to one side of the center of said hub to retain said band in position and prevent unwinding of said tape.

4. A tape retaining means for tape wound on a reel, said reel having a hub and spaced side flanges and with the tape wound on said hub between said flanges having a diameter less than the diameter of said flanges, said retaining means comprising an elastic band of less length than the circumference of said tape and a plurality of yieldable tape engaging members disposed on said band in spaced relationship, whereby said band may be received between said flanges with a portion of said band and certain of said members engaging said tape and with another portion of said band disposed across the outer side surface of one flange to one side of the center of said hub to retain said band in position and prevent unwinding of said tape.

5. A tape retaining means for tape wound on a reel, said reel having a hub and spaced side flanges and with the tape wound on said hub between said flanges having a diameter less than the diameter of said flanges, said retaining means comprising an elastic band of less diameter than the diameter of said flanges and means slidably mounted on said band for engaging one of said flanges to retain said band on said reel in engagement with said tape to prevent unwinding of said tape.

References Cited in the file of this patent

UNITED STATES PATENTS

| | | |
|---|---|---|
| 731,008 | Wyckoff | June 16, 1903 |
| 1,345,129 | Clarke | June 29, 1920 |
| 1,797,539 | Arthur | Mar. 24, 1931 |
| 2,130,728 | Berkman | Sept. 20, 1938 |
| 2,200,102 | Sepe | May 7, 1940 |